(12) United States Patent
Aotsuka et al.

(10) Patent No.: US 10,883,442 B2
(45) Date of Patent: Jan. 5, 2021

(54) ELECTRONIC CONTROL UNIT

(71) Applicant: DENSO CORPORATION, Kariya (JP)

(72) Inventors: Yuichi Aotsuka, Kariya (JP); Naoya Wakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/735,905

(22) Filed: Jan. 7, 2020

(65) Prior Publication Data

US 2020/0217265 A1 Jul. 9, 2020

(30) Foreign Application Priority Data

Jan. 9, 2019 (JP) ................................. 2019-001888

(51) Int. Cl.
| | |
|---|---|
| *F02M 47/00* | (2006.01) |
| *F02D 41/38* | (2006.01) |
| *F02M 47/02* | (2006.01) |
| *F02D 41/40* | (2006.01) |
| *F02M 63/00* | (2006.01) |
| *F02M 55/02* | (2006.01) |
| *F02D 41/22* | (2006.01) |

(52) U.S. Cl.
CPC ....... *F02D 41/3863* (2013.01); *F02D 41/403* (2013.01); *F02M 47/027* (2013.01); *F02M 63/0028* (2013.01); *F02M 63/0029* (2013.01); *F02D 2041/227* (2013.01); *F02M 55/025* (2013.01); *F02M 2200/44* (2013.01)

(58) Field of Classification Search
CPC .. F02D 41/3863; F02D 41/402; F02D 41/403; F02D 41/405; F02D 2041/227; F02M 47/027; F02M 63/0028; F02M 63/0029

USPC ......................................... 123/299, 456, 479
See application file for complete search history.

(56) References Cited

U.S. PATENT DOCUMENTS

| | | | | |
|---|---|---|---|---|
| 6,032,642 A * | 3/2000 | Trumbower | .......... | F02D 41/402 |
| | | | | 123/299 |
| 6,088,631 A * | 7/2000 | Kuehn | .................... | F16H 61/12 |
| | | | | 701/1 |
| 6,655,326 B2 * | 12/2003 | Purcell | ............... | G05D 23/1917 |
| | | | | 123/41.1 |
| 7,240,660 B1 * | 7/2007 | Bryant | ................ | F02D 41/0087 |
| | | | | 123/299 |

FOREIGN PATENT DOCUMENTS

| | | |
|---|---|---|
| DE | 10 2013 112 751 A1 | 5/2015 |
| WO | 2019/039480 A1 | 2/2019 |

\* cited by examiner

*Primary Examiner* — Erick R Solis
(74) *Attorney, Agent, or Firm* — Posz Law Group, PLC

(57) ABSTRACT

A fuel injection device includes a first driver for driving a first valve and a second driver for driving a second valve. A control device performs an open control of the first valve multiple times by using the first driver, for enabling multi-stage fuel injection from an injection hole in one fuel cycle of an internal combustion engine via a high pressure fuel passage. The control device performs an open-close control of the second valve by using the second driver during an open control of the first valve by using the first driver, for controlling an inclination of injection rate of the fuel injection. The control device stops an output of a drive signal to the second driver when detecting an overheat of a drive circuit based on a temperature detection result of a temperature sensor.

9 Claims, 10 Drawing Sheets

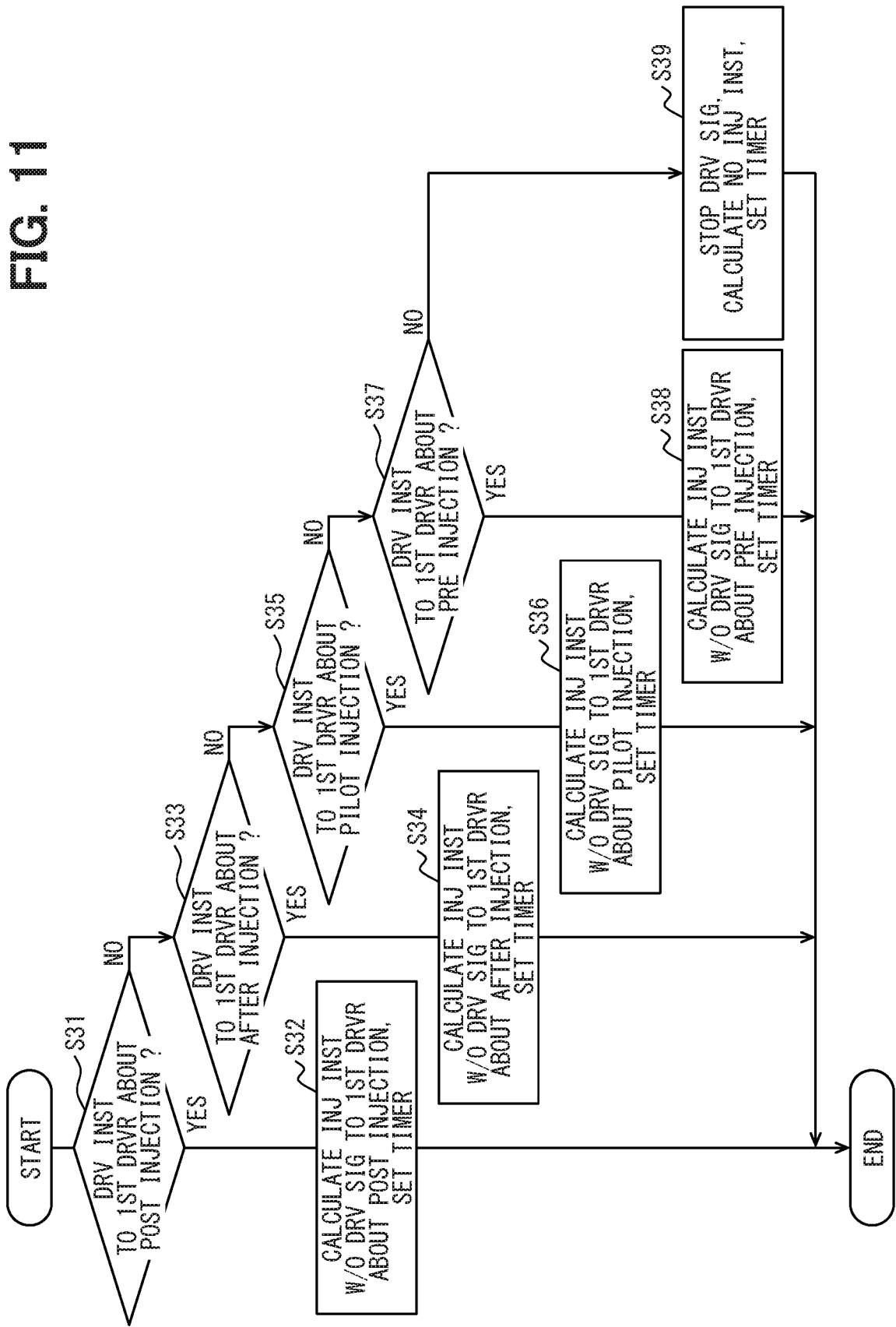

ELECTRONIC CONTROL UNIT

CROSS REFERENCE TO RELATED APPLICATION

The present application is based on and claims the benefit of priority of Japanese Patent Application No. 2019-001888, filed on Jan. 9, 2019, the disclosure of which is incorporated herein by reference.

TECHNICAL FIELD

The present disclosure generally relates to an electronic control device constituting a fuel injection control system capable of controlling a fuel injection rate.

BACKGROUND INFORMATION

In the related art, there is a fuel injection device that injects fuel from the tip of a nozzle by controlling oil pressure using two valves. Recent fuel injection control systems are configured to inject fuel supplied through a high pressure fuel passage by controlling a fuel injection rate. Fuel is injected from an injection hole formed (i.e., opened and closed) by a nozzle needle, and the fuel injection device is provided with a control chamber for accumulating fuel at a back of the nozzle needle. Therefore, the fuel injection rate can be controlled by adjusting the pressure reduction speed of the fuel accumulated in the control chamber. That is because the fuel injection rate is proportional to a pressure reduction rate of the accumulated fuel in the control chamber.

The electronic control device enables multi-stage fuel injection by performing valve open control of a first valve multiple times by using a first driver in one fuel cycle of an internal-combustion engine, and controls the fuel injection rate by performing valve open control of a second valve by using a second driver. A temperature detector is installed in the electronic control device in order to detect overheating of a drive circuit for driving the first driver and the second driver. The electronic control device can suppress heat generation by stopping the drive by the first driver and the second driver in one fuel cycle when overheating is detected by the temperature detector. However, if the electronic control device stops the drive by the first driver and the second driver, the number of fuel injection stages is limited or restricted, and the efficiency of combustion is reduced, leading to deterioration in fuel consumption and emissions.

SUMMARY

It is an object of the present disclosure to provide an electronic control device capable of suppressing a decrease in the efficiency of combustion.

BRIEF DESCRIPTION OF THE DRAWINGS

Objects, features, and advantages of the present disclosure will become more apparent from the following detailed description made with reference to the accompanying drawings, in which:

FIG. 11 is yet another flowchart of an injection instruction setting process;

DETAILED DESCRIPTION

Figure 1:
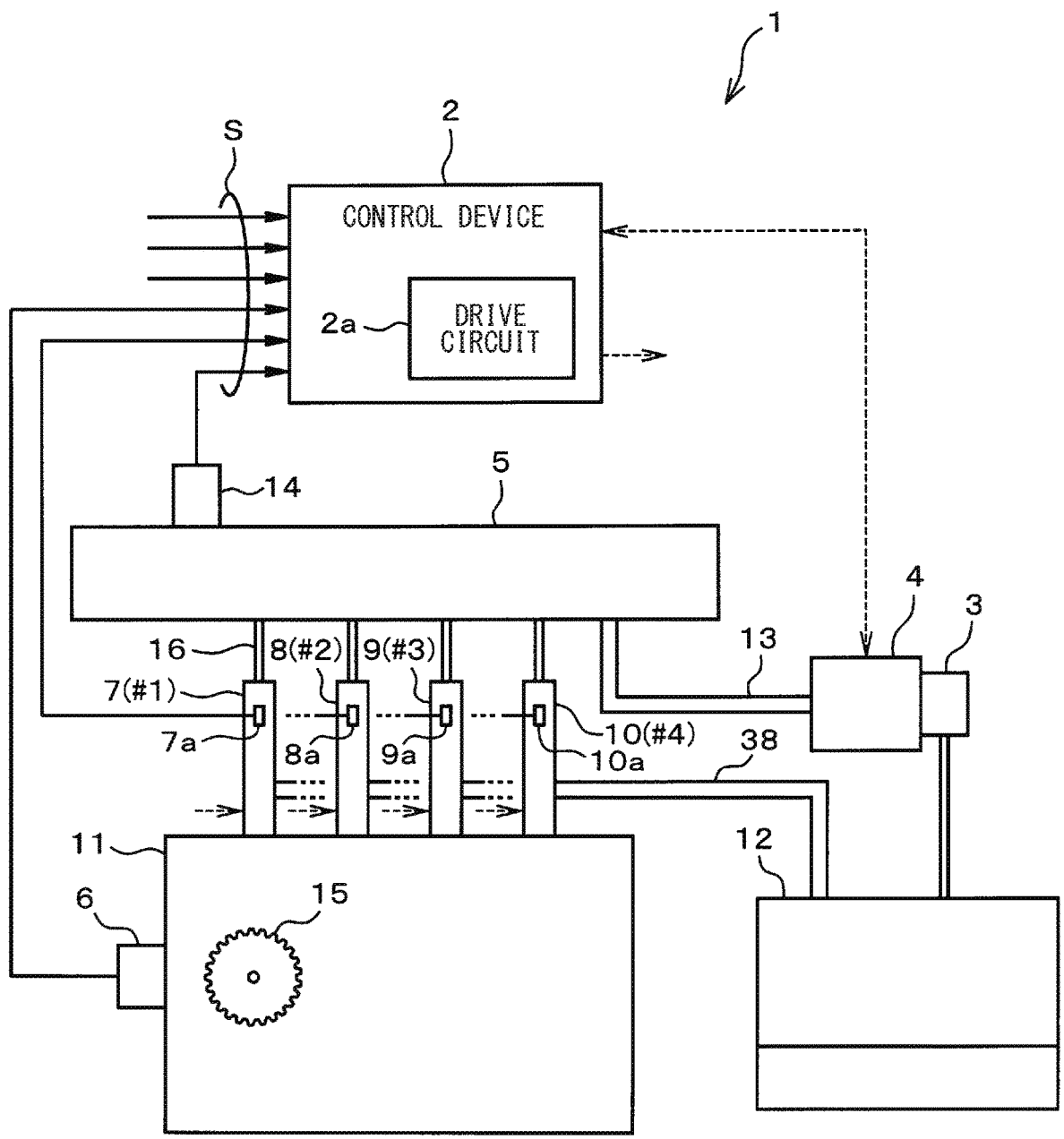
FIG. 1 is a diagram of configuration of a fuel injection control system in a first embodiment of the present disclosure.

Hereinafter, embodiments of the electronic control device are described with reference to the drawings. In each embodiment, configurations that perform the same or similar operations are denoted by the same or similar reference numerals, and description thereof is omitted as necessary.

First Embodiment

The configuration of the fuel injection control system 1 is described with reference to FIG. 1. A fuel injection control system 1 includes, as its main components, a fuel injection control device (hereinafter referred to as a control device) 2 by an ECU (Electronic Control Unit) 2, together with a feed pump 3, a high pressure fuel pump 4, a common rail 5, a crank angle sensor 6, fuel injection devices 7 to 10 and an internal combustion engine 11.

The control device 2 controls the supply of fuel to the combustion chamber of the cylinders #1 to #4 of the internal combustion engine 11 by individually controlling the fuel injection devices 7 to 10.

The control device 2 is provided as, in substance, a microcomputer having an internal memory, and can control an injection rate of fuel injected into the internal combustion engine 11. In the present embodiment, an example of four cylinders is shown, but six cylinders or other numbers of cylinders may also be usable.

Figure 2:
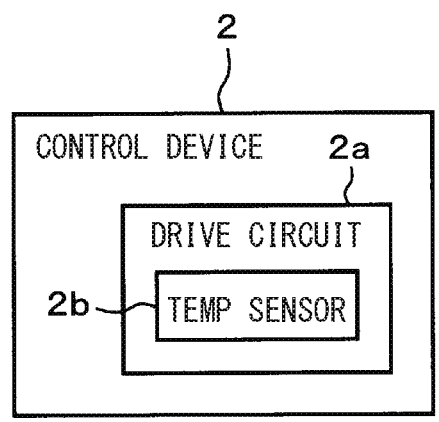
FIG. 2 is a diagram of temperature sensor installation position.
Figure 3:
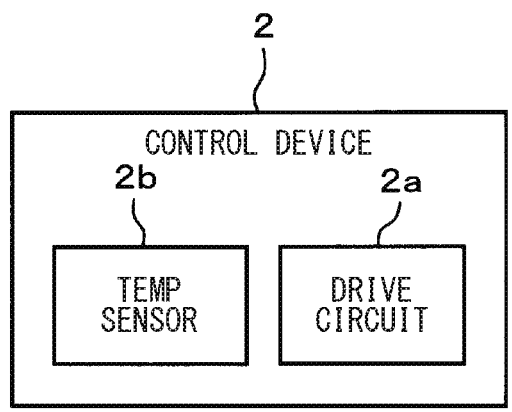
FIG. 3 is another diagram of temperature sensor installation position.

The control device 2 includes a drive circuit 2a, and the drive circuit 2a outputs a drive signal to the fuel injection devices 7 to 10, thereby controlling the injection of fuel from the corresponding fuel injection devices 7 to 10 into the combustion chamber of the internal combustion engine 11. As shown in FIG. 2, the drive circuit 2a directly detects temperature of the drive circuit 2a by including a temperature sensor 2b as a temperature detector provided therein. In the following, a configuration in which temperature of the drive circuit 2a is directly detected is shown, but instead, as shown in FIG. 3, a temperature sensor 2b may be installed at a proximity of the drive circuit 2a, and temperature of the drive circuit 2a may indirectly detected, i.e., may be calculated based on the detected temperature of the temperature sensor 2b and the number of drives by the drive signal of the drive circuit 2a. The temperature sensor 2b may be provided for the purpose of detecting temperature of other circuit blocks provided in the control device 2.

When the control device 2 indirectly calculates and detects the temperature of the drive circuit 2a, for example, the temperature of the drive circuit 2a may be estimated by adding (number of outputs of drive signals)×(temperature rise due to heat generation per drive) to the detected temperature by the temperature sensor 2b. By adopting such a temperature detection method, the temperature sensor 2b can directly detect the temperature of the drive circuit 2a, or can indirectly detect it by calculating the estimated temperature based on the number of outputs of the drive signal. As a result, even if the number of drives by the drive circuit 2a increases and the temperature rises to a high value, it is possible to detect overheating of the drive circuit 2a.

The feed pump 3 shown in FIG. 1 pumps the fuel stored in a fuel tank 12 to the high pressure fuel pump 4. The high pressure fuel pump 4 is, for example, a plunger type pump. The high pressure fuel pump 4 is driven by a pump drive unit of the control device 2 using an output shaft of the internal combustion engine 11. The high pressure fuel pump 4 boosts a low-pressure fuel supplied from the feed pump 3 to produce high pressure fuel, and supplies the high pressure fuel to the common rail 5 through a high pressure fuel pipe 13. The common rail 5 is provided for supplying fuel to the fuel injection devices 7 to 10. The common rail 5 temporarily accumulates the high pressure fuel supplied from the high pressure fuel pump 4, and distributes the high pressure fuel to the fuel injection devices 7 to 10 through a high pressure pipe 16 while maintaining the high pressure.

The common rail 5 is provided with a pressure sensor 14. The pressure sensor 14 detects the fuel pressure accumulated in the common rail 5, and outputs a detection signal to the control device 2. The crank angle sensor 6 is configured by being combined with a signal rotor 15, and detects rotation of a crankshaft (not shown) inside the internal combustion engine 11. The signal rotor 15 is configured, for example, in a disk shape, and rotates integrally with, for example, the crankshaft of the internal combustion engine 11. A large number of protrusions are formed on the outer periphery of the signal rotor 15, and the crank angle sensor 6 outputs a crank angle signal corresponding to an approach and a departure of the protrusions of the signal rotor 15.

The control device 2 can calculate an engine rotation number in response to receiving a crank angle signal from the crank angle sensor 6. The control device 2 changes and controls a torque for rotating the crankshaft with the change of a sensor signal S. The control device 2 controls fuel injection through the fuel injection devices 7 to 10 based on various sensor signals S including the crank angle signal.

<Basic Configuration and Operation Explanation of Fuel Injection Devices 7 to 10>

The basic configuration and operation of the fuel injection devices 7 to 10 are described below. The fuel injection devices 7 to 10 are provided for injecting fuel into the cylinders of the internal combustion engine 11, and may also be referred to as injectors or fuel injection valves. In the present embodiment, an example describes an application of solenoid type fuel injection devices 7 to 10. The fuel injection devices 7 to 10 are provided with built-in pressure sensors 7a to 10a, respectively. Although not shown, the built-in pressure sensors 7a to 10a are disposed inside the fuel injection devices 7 to 10 so as to be in contact with the high pressure fuel. The fuel injection devices 7 to 10 all have the same structure. Therefore, hereinafter, the structure of the fuel injection device 7 is described with reference to FIG. 2, and the description of the structure of the fuel injection devices 8 to 10 is omitted.

Figure 4:
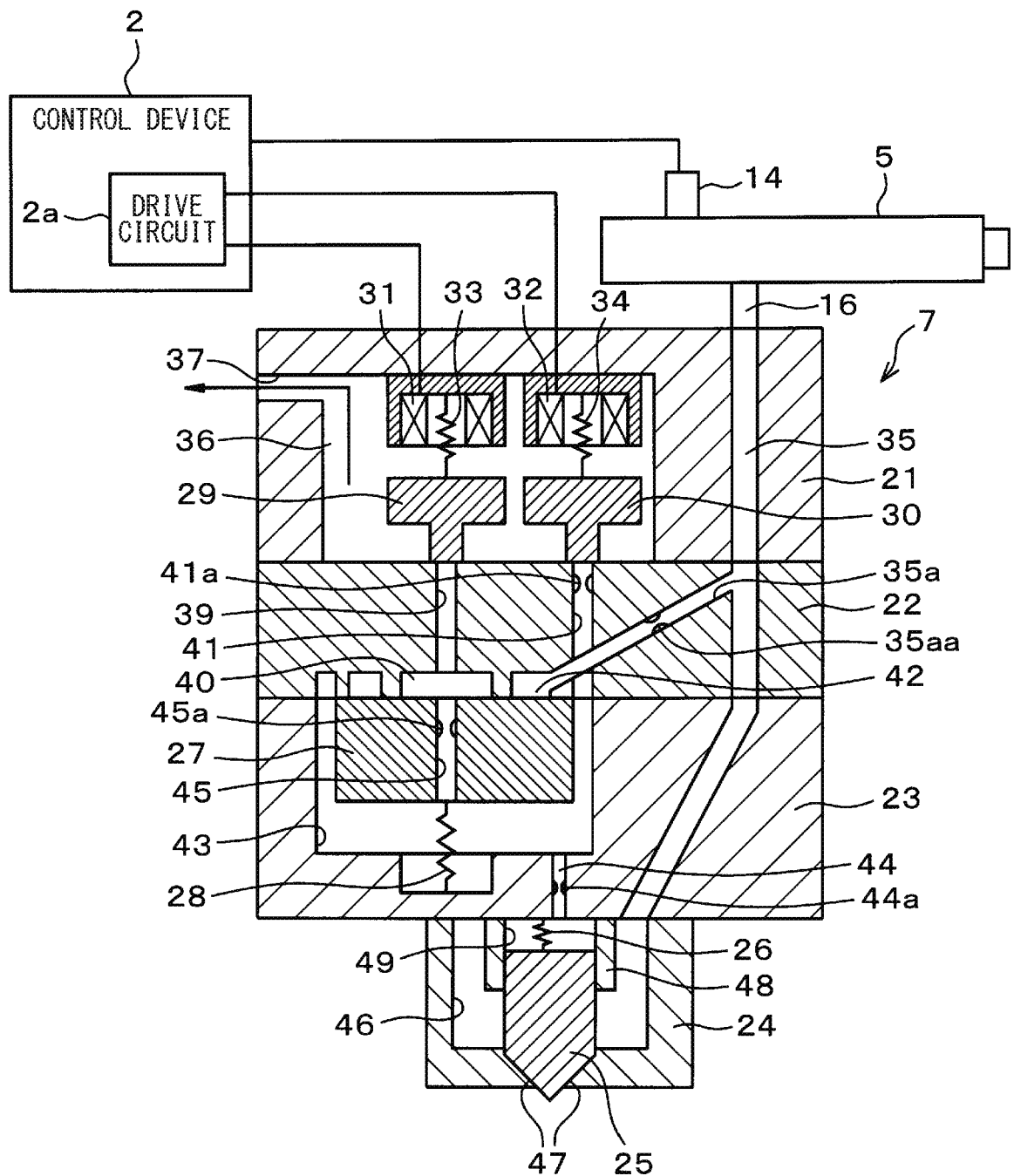
FIG. 4 is a cross sectional view of an internal structure of a fuel injection device.

As shown in FIG. 4, the fuel injection device 7 includes first to fourth members 21 to 24, a nozzle needle 25, a spring 26 for the nozzle needle 25, a hydraulic driven valve 27, a spring 28 for the hydraulic driven valve 27, a first valve 29, a second valve 30, a first driver 31, a second driver 32, a first spring 33, a second spring 34, and the like are provided as main components.

The first member 21 includes a first high pressure fuel passage 35, a low pressure chamber 36, and a low pressure passage 37. When the first to third members 21 to 23 are assembled, the first high pressure fuel passage 35 is configured to penetrate through the first to third members 21 to 23. The first high pressure fuel passage 35 is connected to the common rail 5 through the high pressure pipe 16, and high pressure fuel is supplied from the common rail 5 through the high pressure pipe 16.

The low pressure chamber 36 provided in the first member 21 is configured to communicate with a third passage 39, i.e., an opening on a second member 22 side when the first valve 29 is opened, and when the first valve 29 is closed, the third passage 39 is configured to be blocked or interrupted. Further, the low pressure chamber 36 is configured to communicate with a second passage 41, i.e., an opening on a second member 22 side when the second valve 30 is opened, and when the second valve 30 is closed, the second passage 41 is configured to be blocked.

In the low pressure chamber 36, the periphery of the opening on the second member 22 side between the first member 21 and the second member 22 is sealed. Further, the low pressure chamber 36 is configured to communicate with the low pressure passage 37. A low pressure pipe 38 shown in FIG. 1 is connected to the low pressure passage 37. The low pressure fuel inside the low pressure chamber 36 flows out from the low pressure chamber 36 and is returned to the fuel tank 12 via the low pressure passage 37 and the low pressure pipe 38.

The first valve 29, the second valve 30, the first driver 31, the second driver 32, the first spring 33, and the second spring 34 are arranged inside the low pressure chamber 36 of the first member 21.

Usually, the first spring 33 is arranged so as to bias the first valve 29 in a direction approaching the third passage 39. In such case, since the first valve 29 is closed, communication between the low pressure chamber 36 and the third passage 39 is blocked. The second spring 34 is arranged so as to bias the second valve 30 in a direction approaching the second passage 41. In such case, since the second valve 30 is closed, communication between the low pressure chamber 36 and the second passage 41 is blocked.

The first driver 31 is a solenoid that generates an electromagnetic force when energized, and repels a biasing force of the first spring 33 to separate or lift the first valve 29 from the second member 22. Thereby, the first valve 29 can be driven to open by energizing the first driver 31, and the low pressure chamber 36 and the third passage 39 can communicate by opening the first valve 29.

The second driver 32 is a solenoid that generates an electromagnetic force when energized, and repels a biasing force of the second spring 34 to separate or lift the second valve 30 from the second member 22. Thereby, the second valve 30 can be driven to open by energizing the second driver 32, and the low pressure chamber 36 and the second passage 41 can communicated by opening the second valve 30.

The second member 22 includes the third passage 39, an intermediate chamber 40, and the second passage 41, and further includes a second high pressure fuel passage 35a branched from the first high pressure fuel passage 35. The high pressure fuel is branched and supplied from the first high pressure fuel passage 35 to the second high pressure fuel passage 35a. The second high pressure fuel passage 35a includes a third orifice 35aa and is connected to an annular chamber 42. The third orifice 35aa limits a flow amount of the high pressure fuel flowing through the second high pressure fuel passage 35a. The second high pressure fuel passage 35a may be provided with a plurality of third orifices 35aa, or the second high pressure fuel passage 35a may have a small flow area so that the structure of the second high pressure fuel passage 35a itself serves as the third orifice 35aa.

The second passage 41 includes a second orifice 41a, and connects the low pressure chamber 36 and a first control chamber 43 without passing through the inside of the hydraulic driven valve 27. The second passage 41 may include a plurality of second orifices 41a, or the second passage 41 may have a small flow area so that the structure of the second passage 41 itself serves as the second orifice 41a.

The annular chamber 42 is configured in an annular shape, and is configured to communicate with the first control chamber 43 through an opening on a third member 23 side. The first control chamber 43 is configured in the third member 23. The first control chamber 43 is disposed in contact with the second member 22, and has a partial opening on a second member 22 side. The periphery of the opening between the second member 22 and the third member 23 is sealed. A connection passage 44 is connected to the first control chamber 43. The connection passage 44 is a passage for a connection between the first control chamber 43 and the second control chamber 49. The connection passage 44 includes a fourth orifice 44a, and the fourth orifice 44a restricts the flow amount of the fuel flowing through the connection passage 44. The connection passage 44 may include a plurality of fourth orifices 44a, or the structure of the connection passage 44 itself may have a small flow area so that the structure of the connection passage 44 itself serves as the fourth orifice 44a.

The hydraulic driven valve 27 is disposed inside the first control chamber 43. The hydraulic driven valve 27 is configured in a cylindrical shape. The cylindrical hydraulic driven valve 27 is configured such that the first passage 45 penetrates at its center along the axis direction. The first passage 45 includes a first orifice 45a. The first orifice 45a limits the flow amount of the fuel flowing through the first passage 45. The first passage 45 may include a plurality of first orifices 45a, or the first passage 45 may have a small flow area so that the structure of the first passage 45 itself serves as the first orifice 45a.

Inside the first control chamber 43, the spring 28 is disposed to bias the hydraulic driven valve 27 in a direction approaching the second member 22. When the hydraulic driven valve 27 is in contact with the second member 22, the intermediate chamber 40 communicates with the first control chamber 43 via the first passage 45, but the opening on the third member 23 side of the annular chamber 42 is blocked by the hydraulic driven valve 27.

Figure 5:
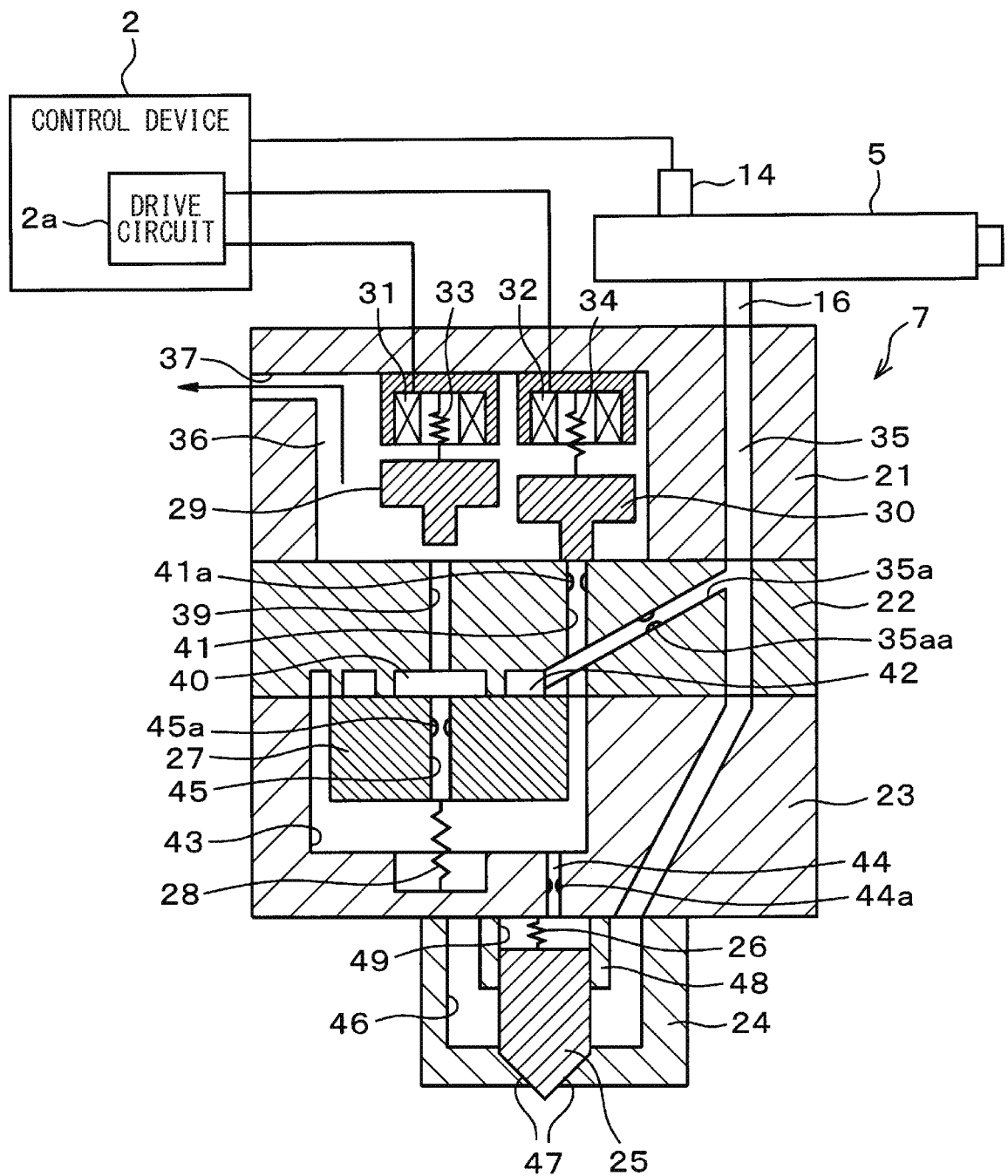
FIG. 5 is another cross sectional view of an internal structure of a fuel injection device.

For example, when the hydraulic driven valve 27 is separated from the second member 22, the intermediate chamber 40 communicates with the first control chamber 43 without passing through the first passage 45, and the annular chamber 42 also communicates with the first control chamber 43 (such a situation not shown). Further, as shown in FIGS. 4 and 5, the second passage 41 is configured to communicate with the first control chamber 43 without passing through the hydraulic driven valve 27. The second passage 41 establishes a direct communication between the low pressure chamber 36 and the first control chamber 43 regardless of the position of the hydraulic driven valve 27, that is, without regard to a lift state of the hydraulic driven valve 27.

As shown in FIG. 4, the fourth member 24 includes a high pressure chamber 46, an injection hole 47, a cylinder 48, and the second control chamber 49. The high pressure fuel is supplied to the high pressure chamber 46 through the first high pressure fuel passage 35. The nozzle needle 25 is disposed inside the fourth member 24. An end portion of the nozzle needle 25 is configured in a conical shape, a proximal end portion of the nozzle needle 25 is configured in a cylindrical shape, and the high pressure chamber 46 surrounds the side surface of the nozzle needle 25. The cylinder 48 supports the nozzle needle 25 so as to be slidable back and forth in the vertical direction of FIG. 4. The second control chamber 49 is disposed behind, i.e., on the back of, the nozzle needle 25. The second control chamber 49 is connected to the first control chamber 43 through the connection passage 44.

The spring 26 that biases the nozzle needle 25 in a direction approaching the injection hole 47 is disposed inside the second control chamber 49. The first control chamber 43 and the second control chamber 49 constitute a control chamber. The injection hole 47 is configured to communicate with the inside of the cylinder of the internal combustion engine 11.

When the pressure inside the second control chamber 49 is higher than a predetermined pressure, the nozzle needle 25 keeps the high pressure chamber 46 and the injection hole 47 blocked, or the nozzle needle 25 closes the injection hole 47 by moving downward in FIG. 4. Conversely, when the pressure in the second control chamber 49 is equal to or lower than the predetermined pressure, the nozzle needle 25 moves toward the third member 23, that is, upward in the drawing. In such a case, high pressure fuel is injected via the injection hole 47 from the inside of the high pressure chamber 46. Therefore, based on the pressure inside the first control chamber 43 and the second control chamber 49, the high pressure chamber 46 and the cylinder of the internal combustion engine 11 can be communicated and blocked.

<Explanation of Pressure Change in each Chamber in an Inside of Fuel Injectors 7-10>

The fuel injection control system 1 operates by setting various modes, and the control device 2 controls the injection of fuel from the injection holes 47 of the fuel injection devices 7 to 10 based on these modes, and lowers the internal pressure of the common rail 5 by performing a discharge control for discharge fuel to the fuel tank 12 through the fuel injection devices 7 to 10. Hereinafter, the pressure change in each chamber in an inside of the fuel injection devices 7 to 10 accompanying the opening and closing operation of the first valve 29 and the second valve 30 in each mode is described.

First, a situation is assumed that, due to the biasing force of the first spring 33 and the biasing force of the second spring 34, both the first valve 29 and the second valve 30 are closed. When the first valve 29 is closed, communication between the third passage 39 and the low pressure chamber 36 is blocked. When the second valve 30 is closed, communication between the second passage 41 and the low pressure chamber 36 is blocked. In such an initial state, the insides of the second control chamber 49, the first control chamber 43, the intermediate chamber 40, the third passage 39, and the second passage 41 are respectively sealed, and the fuel pressures inside each of those chambers balance all in a high pressure state. Therefore, the injection hole 47 is closed. The hydraulic driven valve 27 abuts on the second member 22 by being biased by the spring 28.

<Low Speed Mode>

Hereinafter, a change in the pressure state of each chamber in the fuel injection devices 7 to 10 in the low speed mode in which fuel is injected from the injection hole 47 into the internal combustion engine 11 relatively slowly is described. In the low speed mode, the control device 2 opens the first valve 29 with the second valve 30 kept closed from the initial state, and then closes the first valve 29.

As shown in FIG. 5, when the first valve 29 is opened while the second valve 30 is closed, the third passage 39 and the low pressure chamber 36 communicate with each other. The low pressure chamber 36, the intermediate chamber 40, and the first control chamber 43 communicate with each other through the third passage 39. As a result, the first control chamber 43 and the intermediate chamber 40 have a reduced pressure, and the intermediate chamber 40 also has a reduced pressure, which is substantially the same as the pressure of the low pressure chamber 36.

Further, even though the fuel accumulated in the first control chamber 43 flows toward the intermediate chamber 40 through the first passage 45, the flow amount of the fuel through the first orifice 45a is limited by the effects of the first orifice 45a. Accordingly, the first passage 45 generates a pressure difference before and after the first orifice 45a. As a result, the first control chamber 43 is maintained at an intermediate pressure state.

The hydraulic driven valve 27 is attracted to an intermediate chamber 40 side of the second member 22 by the fuel pressure inside the first control chamber 43. Since the opening of the annular chamber 42 on the third member 23 side is closed by the hydraulic driven valve 27, a block state between the second high pressure fuel passage 35a and the first control chamber 43 is maintained.

Since the pressure in the first control chamber 43 is in an intermediate pressure state, the pressure in the second control chamber 49 also changes to an intermediate pressure state. Then, the high pressure fuel acts on the nozzle needle 25 through the first high pressure fuel passage 35, and slides the nozzle needle 25 along the cylinder 48 toward the second control chamber 49. As a result, the nozzle needle 25 is opened, and high pressure fuel is injected from the injection hole 47. At such time, since the fuel flow path through the first orifice 45a is relatively narrowly limited, a speed at which the first control chamber 43 reaches the intermediate pressure state is also low. As a result, a speed at which the nozzle needle 25 opens the injection hole 47 becomes relatively low, and the change in the fuel injection amount along time, that is, the injection rate is relatively low.

Thereafter, when the first valve 29 is closed, the third passage 39, the intermediate chamber 40, the second passage 41, and the first control chamber 43 are sealed, but the fuel in the first control chamber 43 flows through the first orifice 45a, to flow into the intermediate chamber 40 and the third passage 39. On the other hand, since a pressure difference is generated between the annular chamber 42 and the first control chamber 43, the fuel inside the second high pressure fuel passage 35a presses to repel the biasing force of the spring 28 through the annular chamber 42, to lift the hydraulic driven valve 27.

In such manner, a lift amount of the hydraulic driven valve 27 is reduced, and the high pressure fuel flows into the first control chamber 43 and the second control chamber 49 through the annular chamber 42, and, as a result, the first control chamber 43 and the second control chamber 49 respectively have high pressure. When the internal pressures of the first control chamber 43 and the second control chamber 49 change to a high pressure state similar to the pressure of the first high pressure fuel passage 35, the biasing force of the spring 28 acts, and the hydraulic driven valve 27 abuts on the second member 22. As a result, the hydraulic driven valve 27 blocks communication between the annular chamber 42 and the first control chamber 43, returning to the initial state.

<High Speed Mode>

Hereinafter, a change in the pressure state of each chamber in the fuel injection device 7 in the high speed mode when fuel is injected at high speed from the injection hole 47 is described. In the high speed mode, the control device 2 controls the first valve 29 and the second valve 30 to be opened almost simultaneously from the initial state.

Figure 6:
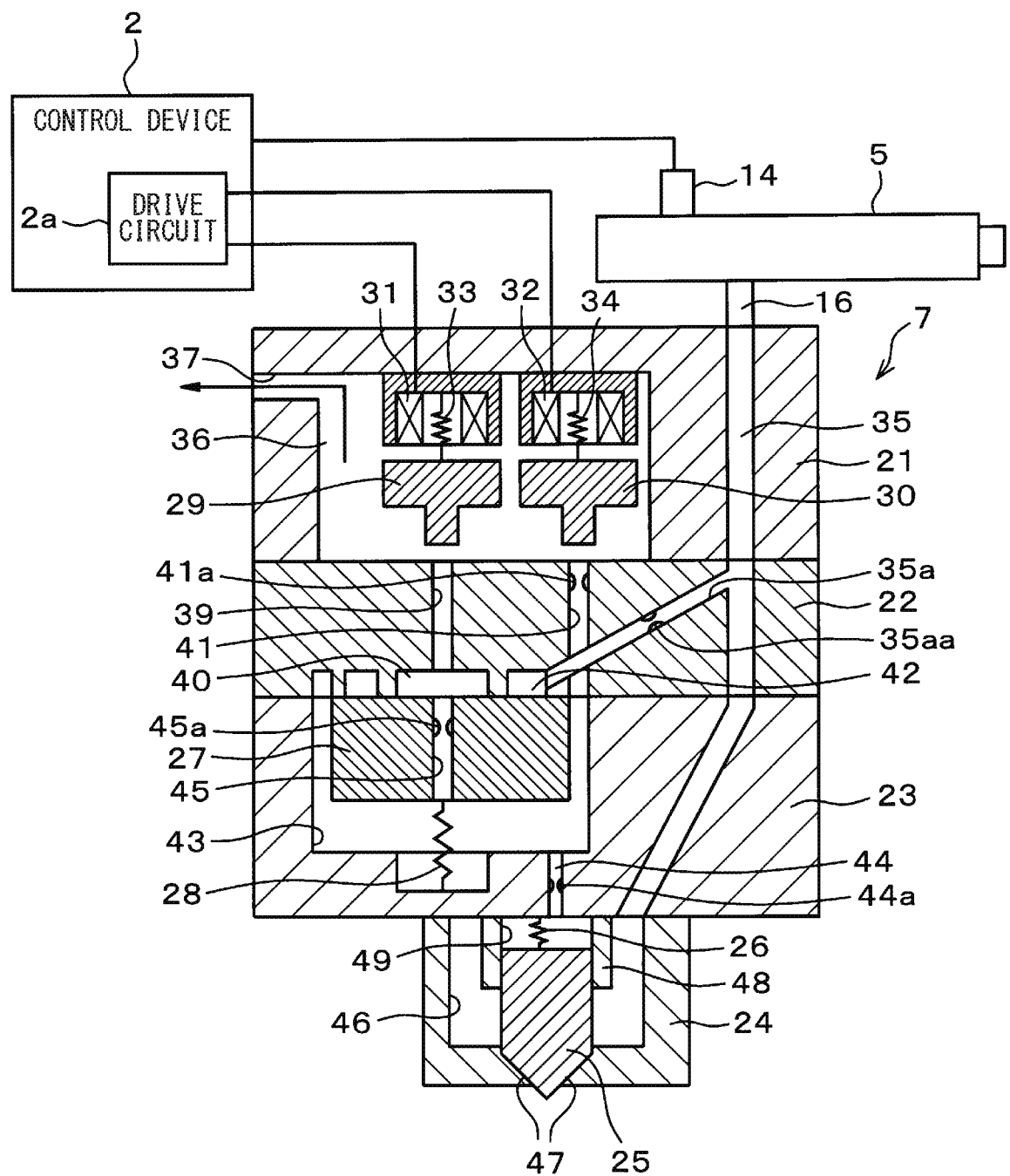
FIG. 6 is yet another cross sectional view of an internal structure of a fuel injection device.

As shown in FIG. 6, when the first valve 29 and the second valve 30 are opened almost simultaneously, the third passage 39 and the low pressure chamber 36 communicate with each other, and the second passage 41 and the low pressure chamber 36 communicate with each other. Therefore, the low pressure chamber 36, the intermediate chamber 40, and the first control chamber 43 communicate with each other through the third passage 39 and the second passage 41. Thereby, the first control chamber 43 and the intermediate chamber 40 respectively have a reduced pressure.

At such time, the pressure in the intermediate chamber 40 is reduced to the same level as that of the low pressure chamber 36, which is enabled quicker than a situation in which only the first valve 29 is opened. Further, even though the fuel accumulated in the first control chamber 43 flows to the intermediate chamber 40 side through the first passage 45, the flow amount of the fuel is limited due to the first orifice 45a. At such time, the first passage 45 generates a pressure difference before and after the first orifice 45a.

On the other hand, the fuel inside the first control chamber 43 flows through the second passage 41 to the low pressure chamber 36. At such time, due to the effect of the second orifice 41a, the fuel flow amount through the second orifice 41a is also limited. The second passage 41 generates a pressure difference before and after the second orifice 41a. As a result, the first control chamber 43 is maintained at the intermediate pressure state.

At such time, the hydraulic driven valve 27 is attracted to the intermediate chamber 40 side of the second member 22 by the fuel pressure inside the first control chamber 43. Since the opening of the annular chamber 42 on the third member 23 side is closed by the hydraulic driven valve 27, the block state between the second high pressure fuel passage 35a and the first control chamber 43 is maintained.

When the first control chamber 43 is in the intermediate pressure state, the pressure in the second control chamber 49 also changes to the intermediate pressure state. Since the first control chamber 43 and the second control chamber 49 are both in the intermediate pressure state, when high pressure fuel acts on the nozzle needle 25 through the first high pressure fuel passage 35, the nozzle needle 25 moves along the cylinder 48 toward the second control chamber 49 as described above. As a result, the nozzle needle 25 is opened, and high pressure fuel is injected from the injection hole 47. At such time, the fuel flow passage through the first orifice 45a and the second orifice 41a is restricted but is wider as compared with the low speed mode described above, thereby a speed at which the first control chamber 43 reaches the intermediate pressure state is higher than the low speed mode. As a result, a speed at which the nozzle needle 25 opens the injection hole 47 becomes relatively high, and the change in the fuel injection amount along time, that is, the injection rate becomes relatively high.

Thereafter, even if the second valve 30 is closed, the internal hydraulic pressure in each chamber such as the first control chamber 43 is not substantially changed, but thereafter, the internal fuel in the first control chamber 43 flows into the intermediate chamber 40 and the third passage 39 through the first orifice 45a, due to the closure of the first valve 29. At such time, the third passage 39, the intermediate chamber 40, the second passage 41, and the first control chamber 43 are sealed, and the intermediate chamber 40 and the first control chamber 43 are respectively put in the intermediate pressure state.

Since a pressure difference is generated between the annular chamber 42 and the first control chamber 43, the fuel in the second high pressure fuel passage 35a presses to repel the biasing force of the spring 28 through the annular chamber 42, to lift the hydraulic driven valve 27. In such manner, a lift amount of the hydraulic driven valve 27 is reduced, and the high pressure fuel flows into the first control chamber 43 and the second control chamber 49 through the annular chamber 42, and, as a result, the first control chamber 43 and the second control chamber 49 respectively have high pressure. When the internal pressures of the first control chamber 43 and the second control chamber 49 change to a high pressure state similar to the pressure of the first high pressure fuel passage 35, the biasing force of the spring 28 acts and the hydraulic driven valve 27 abuts on the second member 22. As a result, the hydraulic driven valve 27 blocks communication between the annular chamber 42 and the first control chamber 43, returning to the initial state.

<Difference in Lift Speed of Nozzle Needle 25 Based on Open/Close State of Second Valve 30>

When the first valve 29 and the second valve 30 are opened approximately at the same time, the internal pressure of the first control chamber 43 decreases more quickly than when only the first valve 29 is opened. Therefore, when the first valve 29 and the second valve 30 are opened almost simultaneously, the lift speed of the nozzle needle 25 is faster than when only the first valve 29 is opened. Therefore, when the first valve 29 and the second valve 30 open simultaneously, the injection rate can be made higher compared with a case where only the first valve 29 is opened.

<Pressure Reduction Control of in an Inside of Common Rail 5>

Although details are omitted, when the control device 2 reduces the internal pressure of the common rail 5, the control is performed so that the second valve 30 is opened while the first valve 29 is kept closed. Thereby, the fuel is discharged from the low pressure chamber 36 without opening the injection hole 47 (i.e., without lifting the nozzle needle 25), which reduces the internal pressure of the common rail 5.

Figure 7:
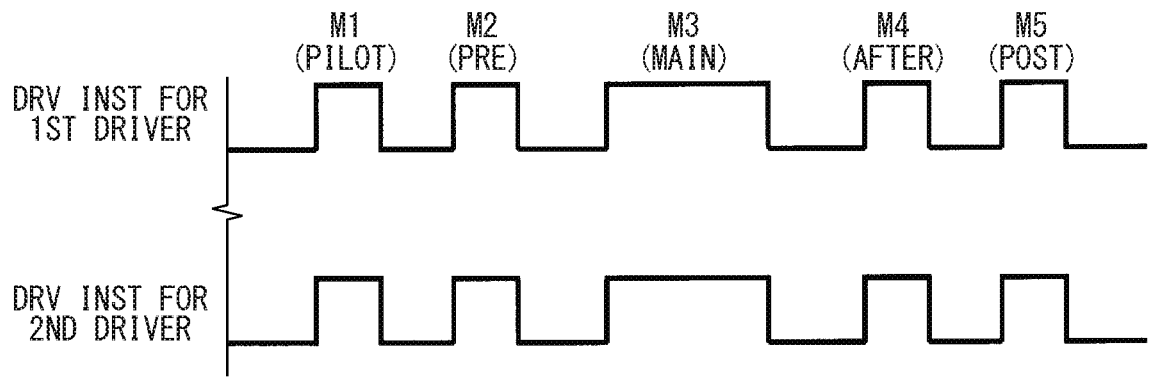
FIG. 7 is a diagram of drive instructions to a first driver and a second driver.
Figure 8:
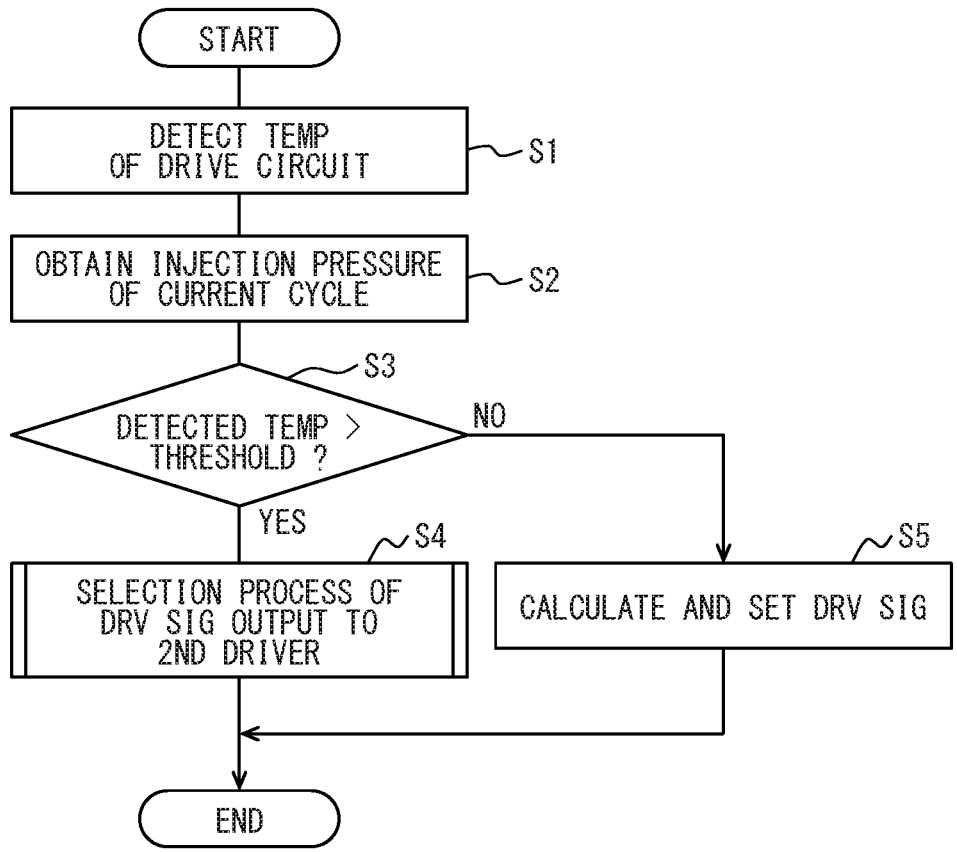
FIG. 8 is a flowchart of an injection instruction setting process.

When the internal combustion engine 11 has a four-cylinder four-cycle configuration, during one fuel cycle having a crank angle signal in a range of a crank angle 180° CA with reference to the top dead center, fuel injection may be performed one time, three times, five time, seven times or the like, i.e., a multi-stage injection is performed. The control device 2 controls the opening of the first valve 29 a plurality of times by the first driver 31 during one fuel cycle of the internal combustion engine 11, so that a multi-stage fuel injection (for example, M1 to M5) is performed through the high pressure fuel passage 35 from the injection hole 47. For example, as shown in FIG. 7, when five injections are performed during one fuel cycle, that is, five-stage injection is performed, the respective injections have different names: a pilot injection M1, a pre-injection M2, a main injection M3, an after injection M4, and a post-injection M5. For example, when injecting three times, the pre-injection M2 and the post-injection M5 are omitted.

The control device 2 determines the aforementioned high speed mode or low speed mode for each of the injection stages M1 to M5, and generates an injection request for the high speed mode or low speed mode. At such time, as shown in FIG. 7, the control device 2 generates a drive instruction for each of the fuel injection devices 7-10.

Normally, when the control device 2 generates a high-speed mode injection request, the drive instruction for the first driver 31 and the drive instruction for the second driver 32 are independently generated as shown in FIG. 7, and, based on these drive instructions, the energization control is performed by outputting drive signals to the first driver 31 and the second driver 32, respectively. In such case, since the electric current flows through the first driver 31 and the second driver 32 almost simultaneously, the first valve 29 and the second valve 30 are opened almost simultaneously, thereby fuel can be injected into the internal combustion engine 11 from the injection holes 47 of the corresponding fuel injection devices 7 to 10 at high speed.

Further, when the control device 2 generates a low-speed mode injection request, it generates a drive instruction for driving the first valve 29 and outputs a drive signal to the first driver 31 based on such drive instruction, for performing energization control. When the electric current flows through the first driver 31, the first valve 29 is opened, and fuel can be injected into the internal combustion engine 11 through the injection holes 47 of the corresponding fuel injection devices 7 to 10 at low speed. In such manner, the control device 2 can control the slope of the fuel injection rate of the fuel injection by controlling the opening and closing of the second valve 30 by the second driver 32 when the first driver 31 controls the opening of the first valve 29.

<Control Operation when Overheat is Detected>

Hereinafter, the control operation when the control device 2 detects overheating using the temperature sensor 2b is described with reference to FIGS. 8 to 11. When the control device 2 repeats multi-stage injection as described above, the amount of heat generated by the drive circuit 2a increases, and the temperature of the drive circuit 2a rises. In order for the fuel injection devices 7 to 10 to stably inject fuel, a threshold temperature for overheating detection is preset in the operating temperature of the drive circuit 2a, and the control device 2 stores this threshold temperature in an internal memory. The control device 2 detects temperature of the drive circuit 2a in S1 of FIG. 8, and obtains a current injection pressure by detecting a pressure of a relevant one of the fuel injection devices 7-10 from the built-in pressure sensors 7a-10a in S2, and, in S3, it is determined whether or not the detected temperature of the drive circuit 2a is higher than the threshold temperature.

When the control device 2 detects overheating of the drive circuit 2a from the temperature detection result by the temperature sensor 2b, it is determined as YES in S3, and performs a selection process for selecting a drive instruction to the second driver 32 in S4. As shown in S11 to S20 of FIG. 9, when there is a drive instruction to the second driver 32 related to each of the injection stages M1 to M5, the control device 2 may selectively stop an output of the drive signal to the second driver 32 related to each of the injection stages M1 to M5. In such manner, the heat generation of the drive circuit 2a can be suppressed.

The priority of stopping of the drive signal to the second driver 32, i.e., which one of the many stages should be selected as a target of stopping the output of the drive signal, may be determined with reference to the main injection M3, i.e., whether the target output is posterior to M3, or how far the target output is apart from M3. That is, the drive circuit 2a may stop outputting the drive signal to the second driver 32 corresponding to the injection stage after the main injection M3, or may stop outputting the drive signal to the second driver 32 correspond to the injection stage as far away as possible from the main injection M3.

Figure 10:
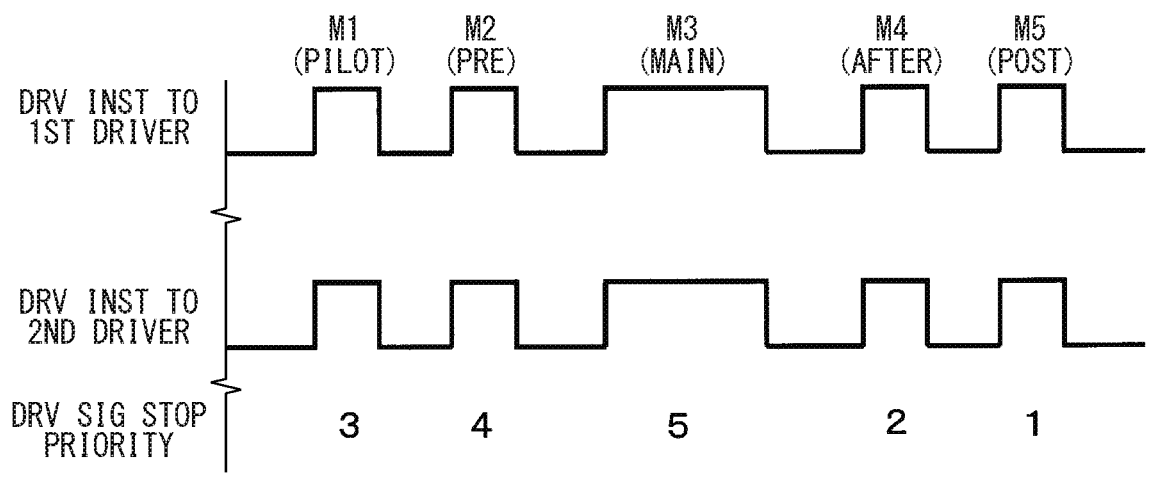
FIG. 10 is a diagram of drive signal output stop priority orders.

As shown in FIG. 10, for example, in case of having five-stage injection, if the post-injection M5 is intended to activate a catalyst and is not directly related to a combustion state of the fuel, the drive signal stop priority of M5 may be set to the highest. Further, if the after injection M4 has a small influence on the driving of the internal combustion engine 11, it may be desirable that the drive signal stop priority for M4 may be set to the second. Further, the pilot injection M1 is a pre-injection of the main injection M3, and if it is involved in the start of fuel burning, it may be desirable not to change the drive signal stop priority for M3 as much as possible, i.e., it may be desirable that the drive signal stop priority for M3 may be set to the third.

Further, it may be desirable that the pre-injection M2 does not have the drive signal stop priority if it has a large influence on the combustion of the fuel. Further, if the pre-injection M2 has a larger in fluence on the combustion by the closeness to the main injection M3 than the pilot injection M1, it may be desirable that the drive signal stop priority of the pre-injection M2 may be set to the fourth. If the main injection M3 is an injection that is directly related to a travel of the vehicle thereby having a greater influence on the combustion, it may be desirable not to change the drive signal, and the drive signal stop priority may be set to the fifth, preferably. When the control device 2 generates an injection instruction for stopping all the drive signals to the second driver 32 by generating injection requests in the low speed mode for all the injection stages M1 to M5, it may be determined as NO in S11, S13, S15, S17, and S19 of FIG. 9, to proceed to a process for reducing an injection stage number and for processing drive signals, and, by performing processes in S31 to S39 in FIG. 11, outputs of the drive signal to the first driver 31 may be stopped similarly, i.e., in similar priority order. In such case, the number of injection stages is reduced.

The influence on combustion and exhaust differs depending on which of the injection stages M1 to M5 is stopped by the control device 2. Therefore, less-influencing drivers 31, 32 and the injection stages M1 to M5 in terms of how stopping of the drivers and/or the injection stages influence the combustion and exhaust may be selected according to the injection stages M1 to M5 related to the generated injection instruction and a pattern of fuel injection rate, for optimizing the stopping of the drive signal related to the injection stages M1 to M5 and optimizing the stopped driver 31 and/or 32 and for minimizing the influence.

Further, the drive signal stop priority output to the second driver 32 may be changed according to the length of the injection time of each of the injection stages M1 to M5. If the influence on the actual fuel injection amount is small when the injection time is short, the drive circuit 2a may select the injection stage with the short injection time in an ascending order, and may stop outputting the drive signal to the second driver 32 in the selected order.

In the above description, the output of the drive signal is stopped in response to the injection stages M4 and M5 after the main injection M3. However, the present disclosure is not limited to such configuration. The drive circuit 2a may stop outputting the drive signal to the second driver 32 corresponding to the injection stages M1 and M2 before the main injection M3. In addition, the priority of stopping the output of the drive signal to the second driver 32 may be determined according to a combination of several criteria among the following or the like, i.e., (i) whether or not an injection is far away from the main injection M3, (ii) whether the length of the injection time is long or short, and/or (iii) whether an injection is before or after the main injection M3.

Practical Example 1

Figure 9:
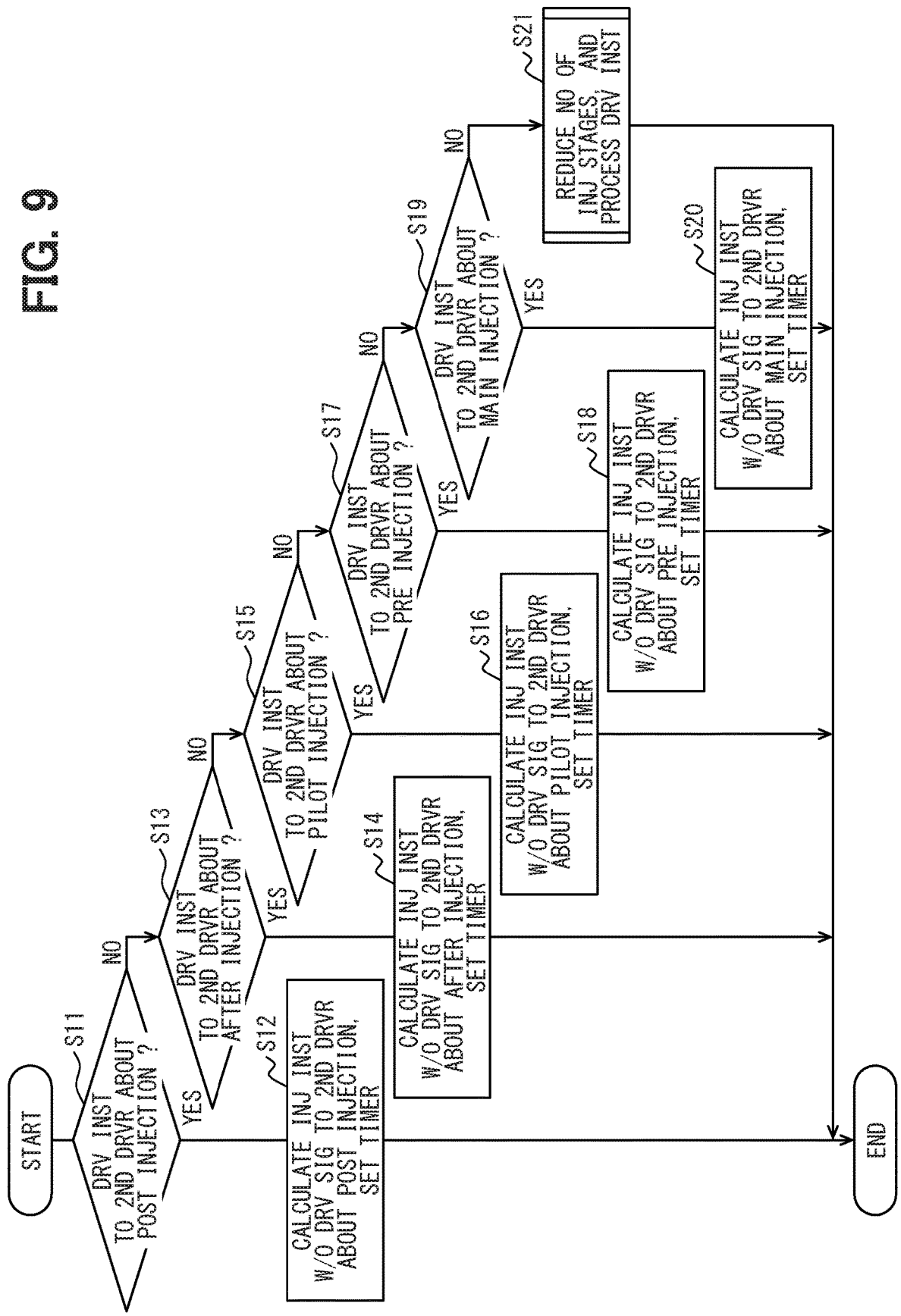
FIG. 9 is another flowchart of an injection instruction setting process.

Hereinafter, with reference to FIGS. 9 to 11, a first example of the control process by the control device 2 is described. As shown in FIG. 9 as S11 to S12 and FIG. 10 as the first stop priority order, when there is a drive instruction for the second driver 32 related to the post injection M5, an injection instruction may be calculated by excluding the drive signal to the second driver 32 related to the post injection M5, and the timer may be set accordingly. Next, as shown in S13 to S14 of FIG. 9 and the second stop priority in FIG. 10, based on a condition that the control device 2 has determined S11 as NO and when there is a drive instruction for the second driver 32 related to the after injection M4, an injection instruction may be calculated by excluding the drive signal to the second driver 32 related to the after injection M4, and the timer may be set accordingly.

Next, as shown in S15 to S16 of FIG. 9 and the third stop priority in FIG. 10, based on a condition that the control device 2 has determined S13 as NO and when there is a drive instruction for the second driver 32 related to the pilot injection M1, an injection instruction may be calculated by excluding the drive signal to the second driver 32 related to the pilot injection M1, and the timer may be set accordingly. Next, as shown in S17 to S18 of FIG. 9 and the fourth stop priority order of FIG. 10, based on a condition that the control device 2 has determined S15 as NO and when there is a drive instruction for the second driver 32 related to the pre-injection M2, an injection instruction may be calculated by excluding the drive signal to the second driver 32 related to the pre-injection M2, and the timer may be set accordingly.

Further, as shown in S19 to S20 in FIG. 9 and the fifth stop priority in FIG. 10, based on a condition that the control device 2 has determined S17 as NO and when there is a drive instruction for the second driver 32 related to the main injection M3, an injection instruction may be calculated by excluding the drive signal to the second driver 32 related to the main injection M3, and the timer may be set accordingly.

If the control device 2 determines NO in S19, it is determined that there is no drive instruction to the second drivers 32, thereby the process proceeds to an injection stage reduction and drive instruction processing in S21. That is, if there is no drive instruction to the second driver 32 related to all the injection stages M1 to M5, the control device 2 proceeds to the injection stage reduction process and the drive instruction calculation process.

In the injection stage reduction and drive instruction calculation process shown in FIG. 11, the control device 2 calculates an injection instruction by selectively removing the drive signal to the first driver 31 and by setting a timer. As shown in S31 to S39 of FIG. 11, when there is a drive instruction to the first driver 31 related to each of the injection stages M1 to M2, M4 to M5, an output of the drive signal to the first driver 31 related to each of the injection stages M1 to M2 and M4 to M5 may be selectively removed, for the reduction of the number of injection stages. In such manner, the heat generation of the drive circuit 2a can be suppressed.

The drive signal stop priority, i.e., priority orders for stopping the drive, of the first driver 31 is also determined as described above. That is, if the posterior injection after the main injection M3 has less influence, the closeness or how far the posterior injection is from M3 may be prioritized. More specifically, as shown in S31 to S32 of FIG. 11, when there is a drive instruction for the first driver 31 related to the post injection M5, the drive signal to the first driver 31 related to the post injection M5 may be excluded from the calculation of the injection instruction and for setting the timer.

Thereafter, as shown in S33 to S38 of FIG. 11, the control device 2 may determine whether or not there is a drive instruction to the first driver 31 in an order of the after injection M4, the pilot injection M1, and the pre-injection M2, and, on condition that such drive instruction or instructions exist, may calculate an injection instruction by excluding a drive signal to the first driver related to the relevant injection states M4, M1, M2, and may set the timer. As shown in S33 to S38 of FIG. 11, when the control device 2 searches for a drive instruction for each of the injection stages M1 to M2 and M4 to M5 (i.e., stages other than the main injection M3) and finds no such drive instruction, the control device 2 calculates an injection instruction to output only a drive signal for the main injection M3, and sets the timer. After calculating the injection instruction and setting the timer in such manner, the control device 2 performs the injection control at a timing of each of the injection stages M1 to M5 by outputting the drive signal from the drive circuit 2a to the first driver 31 and the second driver 32.

Even when the drive circuit 2a stops outputting the drive signal to the second driver 32, the first driver 31 is still drivable. Therefore, the control device 2 is capable of performing the injection control without decrease the number of injection stages by outputting the drive signal to the first driver 31, for enabling the required injection stage. In such manner, the number of drives by the drive circuit 2a can be reduced while minimizing the influence on combustion and exhaust, thereby heat generation can be suppressed. Thus, decrease in the efficiency of combustion can be suppressed while suppressing the deterioration of a fuel consumption or emission.

Practical Example 2

In the above description, an operation mode in which the output of the drive signal to the second driver 32 for one of five stages among the injection stages M1 to M5 has been described. However, the present disclosure is not limited to such configuration. For example, when the control device 2 performs a five-stage injection control, the output of the drive signal to the second driver 32 may be stopped for two stages. At such time, the reduction amount of the output time of the drive signal by the drive circuit 2a can be made equal to be the same as a reduction of one injection stage, thereby enabling suppression of heat generation.

Figure 12:
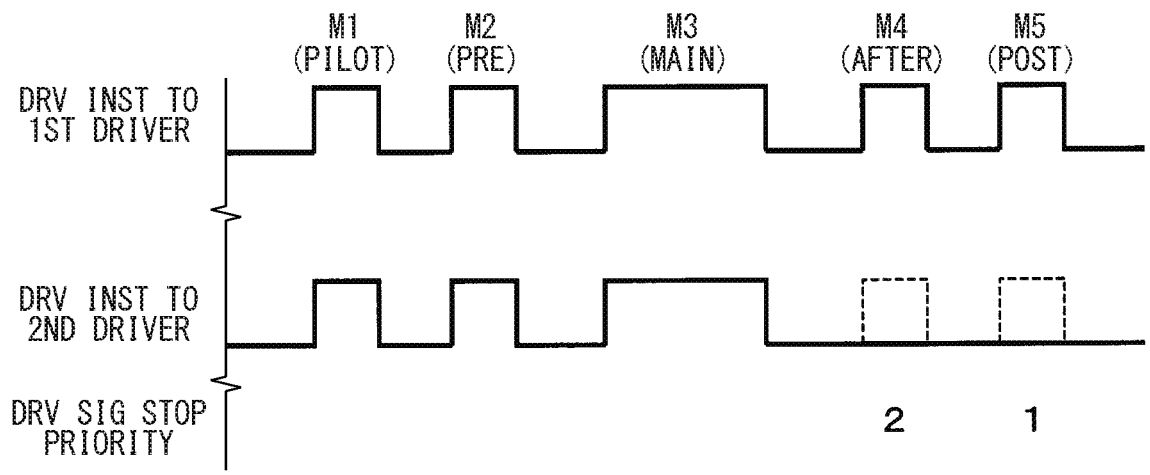
FIG. 12 is another diagram of drive signal output stop priority orders.

As shown in FIG. 12, the output of the drive signal to the second driver 32 related to the post injection M5 and the after injection M4 may be stopped, and, additionally, the output of the drive signal to the first driver 31 related to the post injection M5 and the after injection M4 may also be stopped for the reduction of the number of injection stages.

When an injection request generated by the control device 2 is a request not to output a drive signal to the second driver 32 related to the after injection M4 and the post injection M5, the outputs of the drive signals to the second driver 32 related to the pilot injection M1, the pre-injection M2, and the main injection M3 do not have to be stopped, for performing the injection control.

As described above, according to the first embodiment, when the overheating of the drive circuit 2a is detected from the temperature detection result by the temperature sensor 2b, the output of the drive signal to the second driver 32 is stopped. Thereby, the number of drives by the drive circuit 2a can be reduced, and heat generation of the drive circuit 2a can be suppressed. When the engine rotation number is high, the number of fuel injections per unit time increases, thereby the number of drives of the first driver 31 and the second driver 32 per unit time increases, easily causing a heat generation problem to the drive circuit 2a. In the present embodiment, the drive circuit 2a stops the output of the drive signal only to the second driver 32, thereby reducing the occasions of reducing the number of injection stages. Therefore, the drive feel of the driver can be maintained (i.e., substantially kept unchanged).

Even if the drive circuit 2a of the control device 2 stops the output of the drive signal to the second driver 32 related to the after injection M4 and the post injection M5 that are posterior to the main injection M3, by maintaining the output of the drive signal to the second driver 32, the exhaust performance can be maintained as much as possible. In the present embodiment, the drive circuit 2a stops the output of the drive signal to the second driver 32 related only to the after injection M4 and the post injection M5, thereby reducing the occasions of reducing the number of injection stages and maintaining the exhaust performance as much as possible.

Second Embodiment

Figure 13:
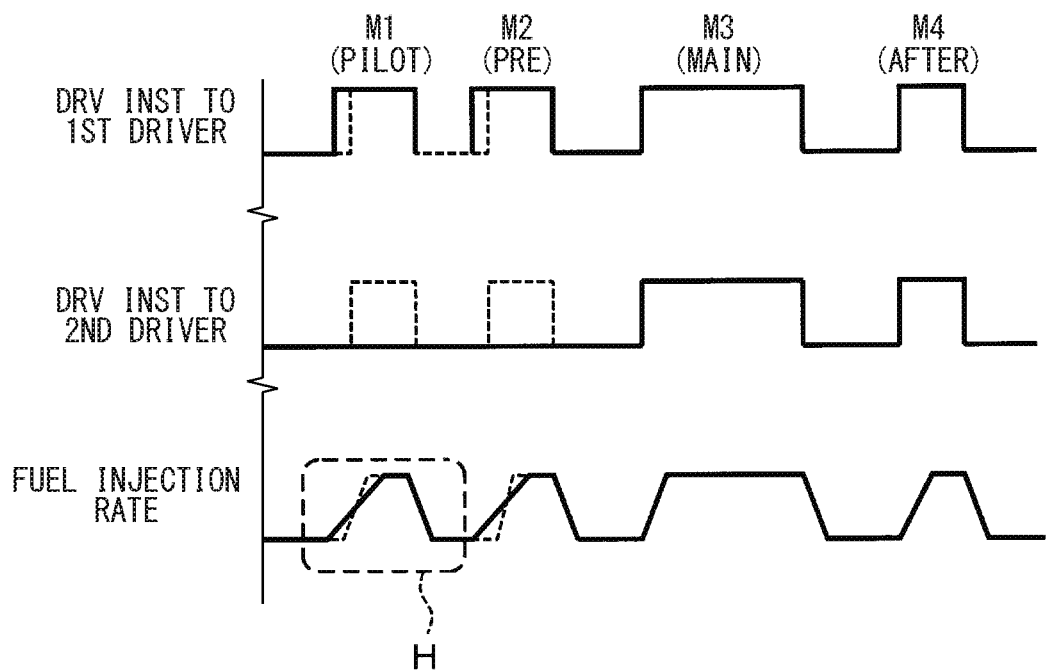
FIG. 13 is a diagram of drive signal output example.
Figure 14:
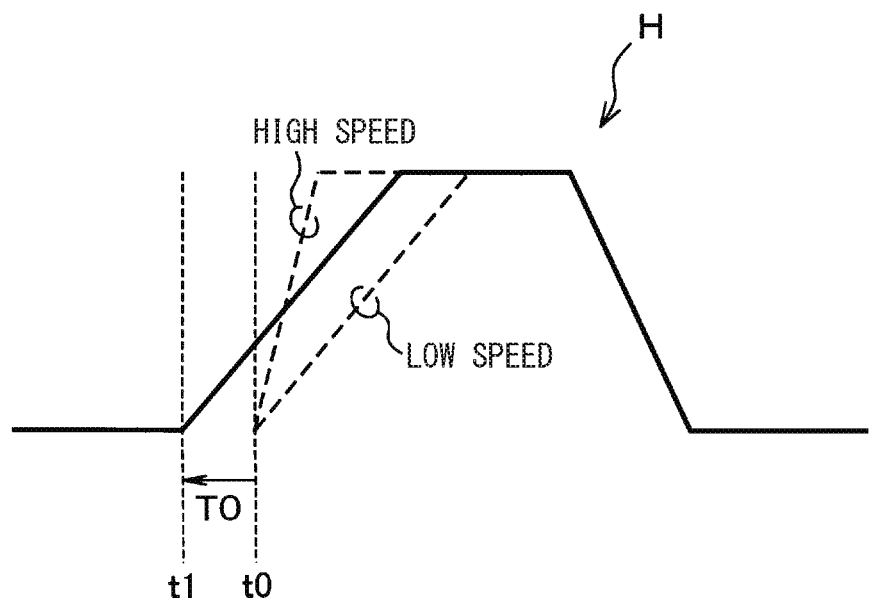
FIG. 14 is an expanded view of drive signal output example.

FIG. 13 and FIG. 14 are diagrams of the second embodiment. The control device 2 compares an instructed injection amount and an internal pressure of the common rail 5 detected by the built-in pressure sensors 7a to 10a or by the pressure sensor 14 with a map, and calculates an injection period. When the drive circuit 2a stops the drive signal to the second driver 32 due to the temperature overheating detected by the temperature sensor 2b, even though the control device 2 drives the first driver 31 to maintain the substantially same injection rate as the low speed mode, the slope of the fuel injection rate decreases and an injection delay time is made different from that in the high speed mode. When the injection timing is calculated by using the same map as described above at the time of stopping of the second valve 30, an actual fuel injection rate decreases down to a level that cannot satisfy the instructed injection amount.

As shown by the solid line in the enlarged view H of FIGS. 13 and 14, when the control device 2 stops the output of the drive signal to the second driver 32 by the drive circuit 2a, the drive signal to the first driver 31 is switched to the drive signal to the second driver 32, i.e., to the one for stopping the output of the drive signal, so as to control the injection amount as intended. The drive circuit 2a controls the injection amount to the intended amount by calculating an injection start timing by using a map that assumes a drive only by the first driver 31. In such manner, the influence of decrease of injection rate slope is minimized, and the amount of heat generation by the drive circuit 2a is suppressed without reducing the number of injection stages.

For example, the control device 2 can adjust the actual injection amount to the instructed injection amount by advancing the timing of the drive signal to the first driver 31 by the drive circuit 2a. In an actual operation, the control device 2 may set the output timing (i.e., an injection start timing) of the drive signal to the first driver 31 to a timing t1 that is earlier than the standard timing t0 by a predetermined amount of time T0 (i.e., may set the time to start at such a timing), for controlling the injection amount to be kept unchanged. In such manner, the impact on adjusted value of optimal combustion for the real environment is minimized, and the amount of heat generation can be suppressed.

Other Practical Examples

In the present disclosure, there can be an example where when the drive circuit stops output of the drive signal to the first driver or to the second driver at a time of multi-stage fuel injection, one of a target driver or a target fuel injection state of stopping is selected as a less-affecting driver or a less-affecting injection stage which is less affecting in terms of combustion of fuel and exhaust gas. In this situation, for example, when multi-stage fuel injection including a main injection is performed, the drive circuit stops output of the drive signal to the second driver corresponding to an injection stage that is distant from the main injection. Or, in another situation, when multi-stage fuel injection is performed, the drive circuit stops output of the drive signal to the second driver selectively targeting an injection stage or stages in an order of shortness of injection time. Another example is when the drive circuit stops output of the drive signal to the second driver, the drive signal to the first driver is switched to the drive signal to the second driver for a drive signal stop time, for performing a control that maintains an injection amount to a constant value.

Other Embodiments

The present disclosure is not limited to the above-described embodiments. For example, the following modifications or expansions are possible. Although only one second orifice 41a is provided in the second passage 41 in the above description, a plurality of passages connecting the low pressure chamber 36 and the first control chamber 43 may be provided. Also, a second orifice 41a may be provided in each of the plurality of passages. That is, at least one second orifice 41a may be provided. The first control chamber 43 and the second control chamber 49 may be configured as an integral chamber.

Although one of two, i.e., high speed and low speed, modes is set for operation by having two instructions, i.e., high speed mode injection instruction and low speed mode injection instruction in the above description, the present disclosure is not limited to such configuration. That is, other operation mode(s) may be set and used. For example, after a drive signal is generated, a certain mode may be set, in which the second valve 30 is opened with a preset delay time after the opening of the first valve 29. In such a case, the injection rate can be changed stepwise.

The control device 2 and the method implemented by it described in the present disclosure may be provided by a dedicated computer, which is provided witFujigaokaa processor and a memory programmed to perform one or more functions realized by a computer program (i.e., a multi-function programmed processor). Alternatively, the control device 2 and the method thereof described in the present disclosure may be realized by a dedicated computer, which is provided by using a processor with one or more dedicated hardware logic circuits (i.e., a hardware logic processor). Alternatively, the control device 2 and the method thereof described in the present disclosure may be a combination of two or more processors, one of which may be a multi-function programmed processor and the other may be a hardware logic processor. Also, computer programs usable in the present disclosure may be stored, as instructions being performable by a computer, in a tangible, non-transitory computer-readable medium.

The configuration of each of the embodiments in the present disclosure can be applied in combination as appropriate. A part of the above-described embodiment may be eliminated as long as the problem identified in the background is resolvable. In addition, various modifications of the present disclosure may be considered as encompassed in the present disclosure, as long as such modifications pertain to the gist of the present disclosure.

Although the present disclosure is described based on the above embodiments, the present disclosure is understood as not limited to such disclosure of the embodiments and the structures, and various modifications can further be made without departing from the scope of the present disclosure.

What is claimed is:

1. An electronic control device of a fuel injection control system including:
    a fuel injector including:
        a nozzle needle injecting fuel from an injection hole, the injected fuel supplied from a common rail via a high pressure fuel passage;
        a control chamber controlling fuel to be injected from the injection hole of the nozzle needle beside storing fuel on a back of the nozzle needle;
        a hydraulic driven valve disposed in the control chamber and passively operable according to a pressure of the high pressure fuel passage and the control chamber;
        a first orifice restricting a first passage in the hydraulic driven valve;
        at least one second orifice restricting each of at least one second passage that connects the control chamber and a low pressure chamber without passing an inside of the hydraulic driven valve;
        a first valve establishing and interrupting communication via the first orifice;
        a second valve establishing and interrupting communication via the second orifice;
        a first driver driving the first valve;
        a second driver driving the second valve; and
    the low pressure chamber disposed to discharge fuel not injected from the injection hole; and
    the electronic control device performing an open control of the first valve by using the first driver multiple times in one fuel cycle of the internal-combustion engine for multi-stage fuel injection from the fuel injection hole via high pressure fuel passage, and enabling a control of a slope of an injection rate of fuel injection by performing an open-close control of the second driver during the open control of the first valve by the first driver, the electronic control device comprising:
    a drive circuit configured to output a drive signal to first and second drivers; and a temperature detector configured to detect a temperature of the drive circuit, wherein the drive circuit, upon detection of an overheat of the drive circuit based on a temperature detection result by the temperature detector, stops output of the drive signal to the second driver.

2. The electronic control device of claim 1, wherein the drive circuit stops output of the drive signal to the second driver while stopping output of the drive signal to the first driver, when an overheat of the drive circuit is detected based on a temperature detection result of the temperature detector.

3. The electronic control device of claim 1, wherein the temperature detector detects temperature of the drive circuit directly by being configured as a temperature sensor disposed at an inside of the drive circuit, or indirectly by calculating temperature of the drive circuit based on (i) a temperature detected by a temperature sensor disposed at a proximity of the drive circuit and (ii) a number of drives according to the drive signal of the drive circuit.

4. The electronic control device of claim 1, wherein when the drive circuit stops output of the drive signal to the second driver, the drive signal to the first driver is switched to the drive signal to the second driver for a drive signal stop time, for performing a control that maintains an injection amount to a constant value.

5. The electronic control device of claim 1, wherein when the drive circuit stops output of the drive signal to the first driver or to the second driver at a time of multi-stage fuel injection, one of a target driver or a target fuel injection state of stopping is selected as a less-affecting driver or a less-affecting injection stage which is less affecting in terms of combustion of fuel and exhaust gas.

6. The electronic control device of claim 5, wherein when multi-stage fuel injection including a main injection is performed, the drive circuit stops output of the drive signal to the second driver corresponding to an injection stage that is distant from the main injection.

7. The electronic control device of claim 5, wherein when multi-stage fuel injection is performed, the drive circuit stops output of the drive signal to the second driver selectively targeting an injection stage or stages in an order of shortness of injection time.

8. The electronic control device of claim 5, wherein when multi-stage fuel injection including a main injection is performed, the drive circuit stops output of the drive signal to the second driver corresponding to an injection stage or stages posterior to the main injection.

9. The electronic control device of claim 5, wherein when multi-stage fuel injection including a main injection is performed, the drive circuit stops output of the drive signal to the second driver corresponding to an injection stage or stages prior to the main injection.

* * * * *